No. 650,056. Patented May 22, 1900.
L. C. SNELL.
APPARATUS FOR MEASURING OIL.
(Application filed July 31, 1899.)
(No Model.)
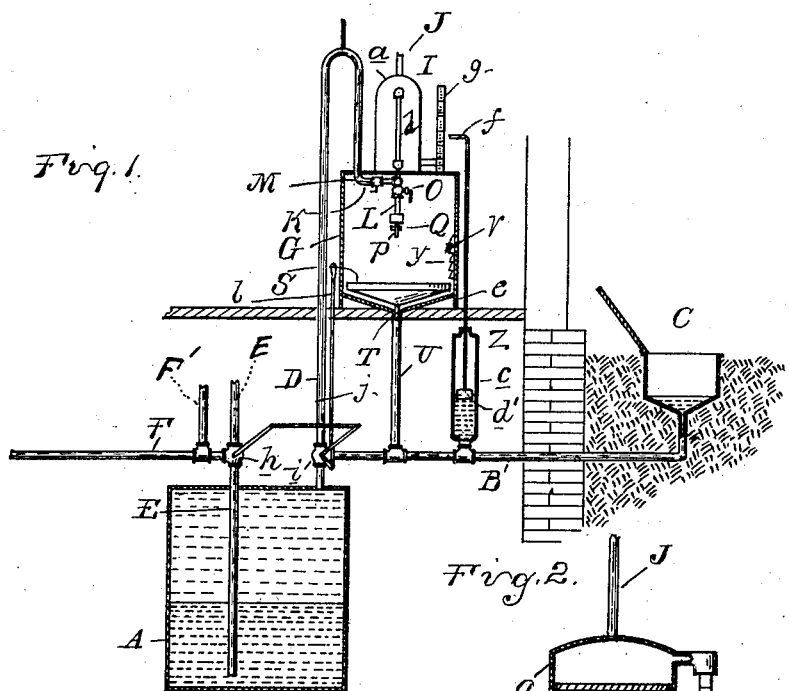
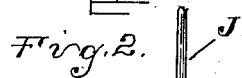
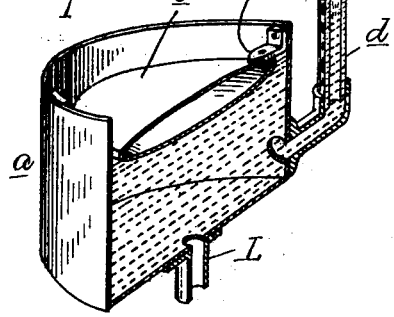
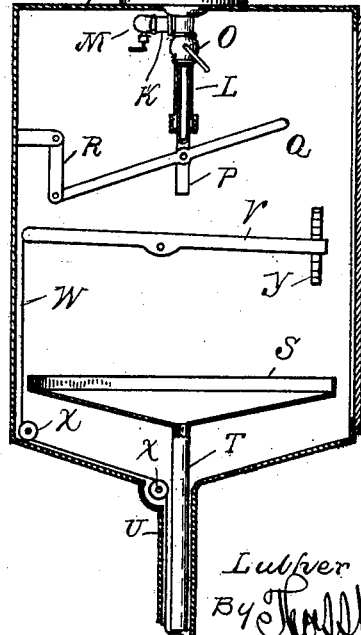
Witnesses
Inventor
Lubver C. Snell

UNITED STATES PATENT OFFICE.

LUTHER C. SNELL, OF DETROIT, MICHIGAN, ASSIGNOR TO THE HYDRAULIC OIL DISTRIBUTION COMPANY, OF SAME PLACE.

APPARATUS FOR MEASURING OIL.

SPECIFICATION forming part of Letters Patent No. 650,056, dated May 22, 1900.

Application filed July 31, 1899. Serial No. 725,632. (No model.)

*To all whom it may concern:*

Be it known that I, LUTHER C. SNELL, a citizen of the United States, residing at Detroit, in the county of Wayne and State of Michigan, have invented certain new and useful Improvements in Apparatus for Measuring Oil, of which the following is a specification, reference being had therein to the accompanying drawings.

The invention relates to apparatus for the handling and measuring of oils, and is especially designed for use in retail stores in connection with the sale of kerosene, gasolene, and other petroleum products.

It is the object of the invention to provide means for readily drawing and measuring the oil and for preventing any escape thereof from the apparatus.

The invention consists in the construction hereinafter shown and claimed.

In the drawings, Figure 1 is a vertical longitudinal section through my apparatus. Fig. 2 is an enlarged section through the measuring and drainage portion of the apparatus. Fig. 3 is a vertical perspective view of a portion of the measuring-receptacle.

A is the storage-tank, preferably placed in a basement or buried in the earth. This tank is connected by a pipe B, leading out from the building, with a suitable fill-receptacle C. It is also provided with a delivery-pipe D, leading up to the place where the oil is to be drawn.

E is a water-pressure connection leading into the bottom of the tank, and F is a water-outlet connected to the pipe E, through which water contained in the tank is displaced when the tank is filled with oil.

F' is a siphon-breaker or upwardly-extending open-ended pipe connected with the pipe F.

The apparatus thus far described has been previously employed and forms no part of my present invention, except as hereinafter set forth, and forms a part of the subject-matter of a concurrently-pending application, Serial No. 725,631.

G is a cabinet, preferably formed of metal and provided at one side with a door, such as H. Above the cabinet is arranged a measuring-receptacle I, which is of the following construction:

$a$ is an outer casing, preferably of cylindrical form, having its axis arranged vertically. Within this casing is arranged a series of disks or horizontal partitions $b$, which extend across the casing, but are of slightly-lesser diameter, so as to leave a marginal passage-way between the periphery of said disk and the casing. These diaphragms or disks are positioned to divide the casing into compartments of a predetermined capacity, such as a gallon or quart, and are preferably secured in place by the lugs or ears $c$, soldered, riveted, or otherwise secured to the walls of the casing. At one side of the casing is arranged a transparent gage or indicator-tube $d$, connected at each end with the casing and having markings corresponding to the positions of the diaphragms $b$. At the upper end of the receptacle I is an upwardly-extending vent-pipe J, which rises sufficiently to prevent the overflow of oil therethrough at the pressure at which it is delivered to the receptacle I. Within the cabinet, beneath the receptacle I, are arranged supply and delivery connections K and L, provided, respectively, with the valve or shut-off cocks M and O. The pipe K connects or is formed integral with the pipe D, leading from the tank A. The connection L is preferably provided with a telescoping extension or nozzle P, which is adapted to be raised or lowered by a lever Q, connected thereto and fulcrumed to a link R, connected to the side of the tank. Beneath the nozzle P is arranged a supporting-shelf and drip-pan S. This is preferably of a slightly conical or dished shape to form a drainage for the oil and is provided with a downwardly-extending tubular stem T, which telescopes into a drainage-pipe U, connected with the bottom of the cabinet. This drainage-pipe preferably extends downward and is connected with the pipe B.

With the apparatus described the operator may draw a measured quantity of oil from the tank A by first opening the valve O, which admits oil from the tank into the bottom of the measuring-receptacle I. The rise of the oil is visible through the glass $d$, and when it reaches the marking indicating the quantity of oil desired the operator closes the valve O.

The object of the disks or partitions b is to enable the operator to more exactly limit the desired quantity. If the height of the column in the glass alone were relied upon, it is obvious that a very slight difference in the level of oil therein would make a considerable difference in the quantity of oil in the receptacle. The position of the partitions, however, prevents the rising of the oil in the body of the receptacle when the compartment beneath any one of said partitions is filled, and although the oil is free to rise around the margin of the partition the space is so limited that but a very little quantity is added until the level has risen above the thickness of the partition. Thus the level in the glass may vary a distance equal to the thickness of the partition without materially varying the quantity of oil in the receptacle. To secure a still greater degree of accuracy, I preferably employ the construction shown in Fig. 3, in which the disks b are shown of a double convex form. With those the oil in the glass rises at a uniform speed until the center of one of the disks is touched by the rising column in the receptacle, after which it rises progressively faster until the margin of the disk is reached. Thus the operator can tell by the speed of the oil in the glass when the measure is nearly complete and by controlling the valve M he may prevent an over measure. Moreover, the double convex form of the disks permits the oil to more readily drain off from their upper surfaces when it is being drawn out from the measuring-receptacle.

When the proper quantity of oil is placed in the receptacle I and the valve M is closed to prevent further filling, the operator opens the valve O and allows the oil in the receptacle to discharge into the can or other holder which he has previously placed below on the shelf S. To direct the oil into the can, the extensible nozzle P is lowered by the lever Q to reach into the mouth of the can. Should the capacity of the receptacle be insufficient to hold the quantity of oil drawn, it will overflow into the pan S, from which it will drain through the pipes T and U into the pipe B.

In order to adjust the height of the shelf S to suit cans or receptacles of different size, I provide the lever V, fulcrumed at one side of the cabinet and connected, by means of a flexible connection W, running over the sheaves X, with the lower end of the tube T. Thus the operator by depressing the handle of the lever V will raise the shelf, which may be held in any position of adjustment by engaging the handle of the lever with a notched bar Y at the side of the cabinet.

In order that the quantity of oil contained in the tank A may be readily determined at any time, I provide a gage or indicator Z, comprising a tube or cylinder $c'$, connected to the pipe B and containing a float $d'$, connected to a rod e, extending upward, preferably to the top of the cabinet, where it is provided with an index-finger f, extending in proximity to a scale g.

The water inlet and outlet pipes and the oil inlet and outlet pipes are respectively provided with three-way valves h and i, which have a common actuating connection j with an operating-handle l, extending upward into proximity to the cabinet. The valve h is adapted in one position to open the pipe E and close the pipe F and in another position to cut off communication between the upper and lower portions of the pipe E and connect the pipe F with said lower portion. In like manner the valve i is adapted in one position to open the pipe D and close the pipe B, while in its other position the upper and lower portions of the pipe D are cut off from each other and the pipe B is connected to the lower portion which enters the tank.

By means of the parts just described the operator may at any time ascertain the quantity of oil contained in the tank A by first drawing up the handle j and operating the three-way valves h and i to cut off the water-pressure connection and the oil-supply connection to the cabinet from the tank A. This will permit the hydrostatic pressure of the water column in the water-outlet pipe F to balance the column in the tank A, pipe B, and cylinder $c'$. When the tank A is entirely filled with oil, the difference in gravity between oil and water will raise the float $d'$ to its higher position, which is indicated by means of the index f on the scale g. As the oil in the tank is displaced by water this column will be composed partially of water and partially of oil, which will have a greater combined specific gravity and will cause the lowering of the fluid and a corresponding movement of the index. Thus the exact quantity of oil in the tank A will be always accurately indicated. Moreover, whenever the handle j is lifted whatever oil is drained through the pipes T and U into the pipe B and receptacle C will be discharged into the tank A.

What I claim as my invention is—

1. A device for dispensing oil in measured quantities comprising a cabinet, a measuring-receptacle thereon, valve-controlled inlet and discharge connections for said receptacle within the cabinet, a series of horizontal disks arranged within said receptacle at different levels forming restrictions for the passage of the oil adapted to accelerate its speed of rising, and a transparent graduated gage for said receptacle.

2. A device for dispensing oil comprising a storage-tank a water-pressure connection to the lower part of said tank a measuring-receptacle above said tank a valve-controlled connection between said tank and measuring-receptacle a valve-controlled discharge-nozzle on said receptacle, a drainage-pan beneath said discharge having a normally-closed connection with said tank, and means for opening said drainage connection and releasing the water-pressure in said tank whereby the oil caught by said drainage-pan may be discharged into the tank.

3. A device for dispensing oil comprising a storage-tank having a water-pressure connection an external fill-receptacle having a normally-closed connection with said tank, an oil-measuring receptacle above said tank, a valve-controlled connection between said tank and receptacle, a valve-controlled discharge-nozzle on said receptacle, a drainage-pan beneath said receptacle connected with said fill connection a gage connected with said fill connection, and means for simultaneously opening said fill connection and releasing the water-pressure on the tank whereby the oil in the drainage-pan may be discharged into the tank and the height of the oil in said tank is indicated.

4. In a device for dispensing oil, a cabinet, a measuring-receptacle on top thereof having a valve-controlled oil-inlet connection, a valve-controlled nozzle extending into said cabinet a drainage-pipe connected to the bottom of said cabinet and a drainage-pan and supporting-shelf vertically adjustably secured with said cabinet and having a telescopic connection with said drainage-pipe.

5. In a device for dispensing liquids the combination with a cabinet for receiving the can or receptacle to be filled of an oil-supply connection at the top of said cabinet, the drainage-pan S within the cabinet having the downwardly-extending pipe T the pipe U connected with the bottom of the cabinet with which the pipe T telescopically engages the lever V and the flexible connection between said lever and the pipe T for the purpose described.

6. In a device for dispensing oil, a measuring-receptacle having a valve-controlled oil-inlet, a valve-controlled nozzle depending from said receptacle, a telescopic extension to said nozzle and the lever Q and fulcrum-link R substantially as and for the purpose described.

7. A device for measuring liquids comprising a receptacle, having valve-controlled inlet and discharge connections at the lower end thereof, a series of horizontal disks or partitions secured within said tank at different levels, each having a marginal restricted passage between its periphery and the walls of the receptacle adapted to accelerate the rise of oil at that point, and a transparent gage-glass connected with said receptacle and having markings corresponding to the position of said disk.

8. A device for measuring liquids comprising a receptacle having valve-controlled inlet and discharge connections to the lower end thereof and a double convex horizontal disk arranged within said receptacle having a marginal passage between its periphery and the walls of the receptacle, substantially as and for the purpose described.

In testimony whereof I affix my signature in presence of two witnesses.

LUTHER C. SNELL.

Witnesses:
JAMES WHITTEMORE,
M. B. O'DOGHERTY.